Jan. 24, 1956  L. O. WARD  2,732,220
VEHICLE SPRING SUSPENSION
Filed June 12, 1953  2 Sheets-Sheet 1
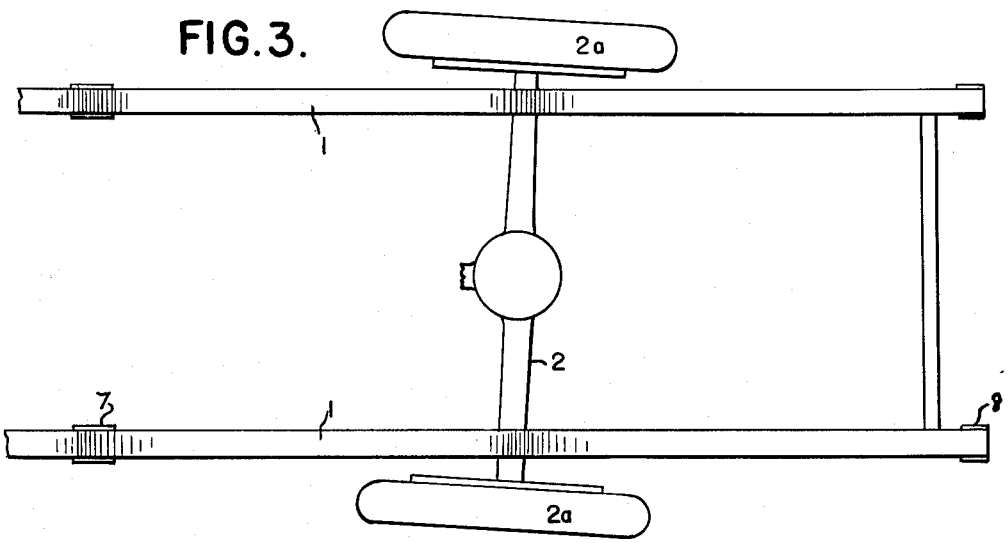
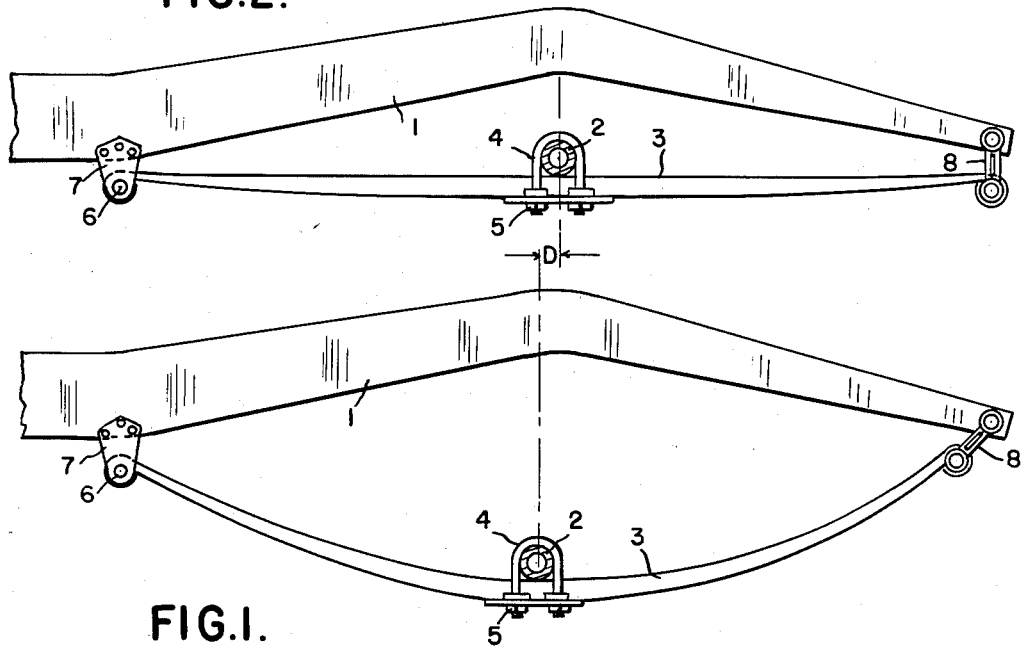
PRIOR ART
*INVENTOR.*
LYLE O. WARD
BY
*J. S. Murray*
ATTORNEY

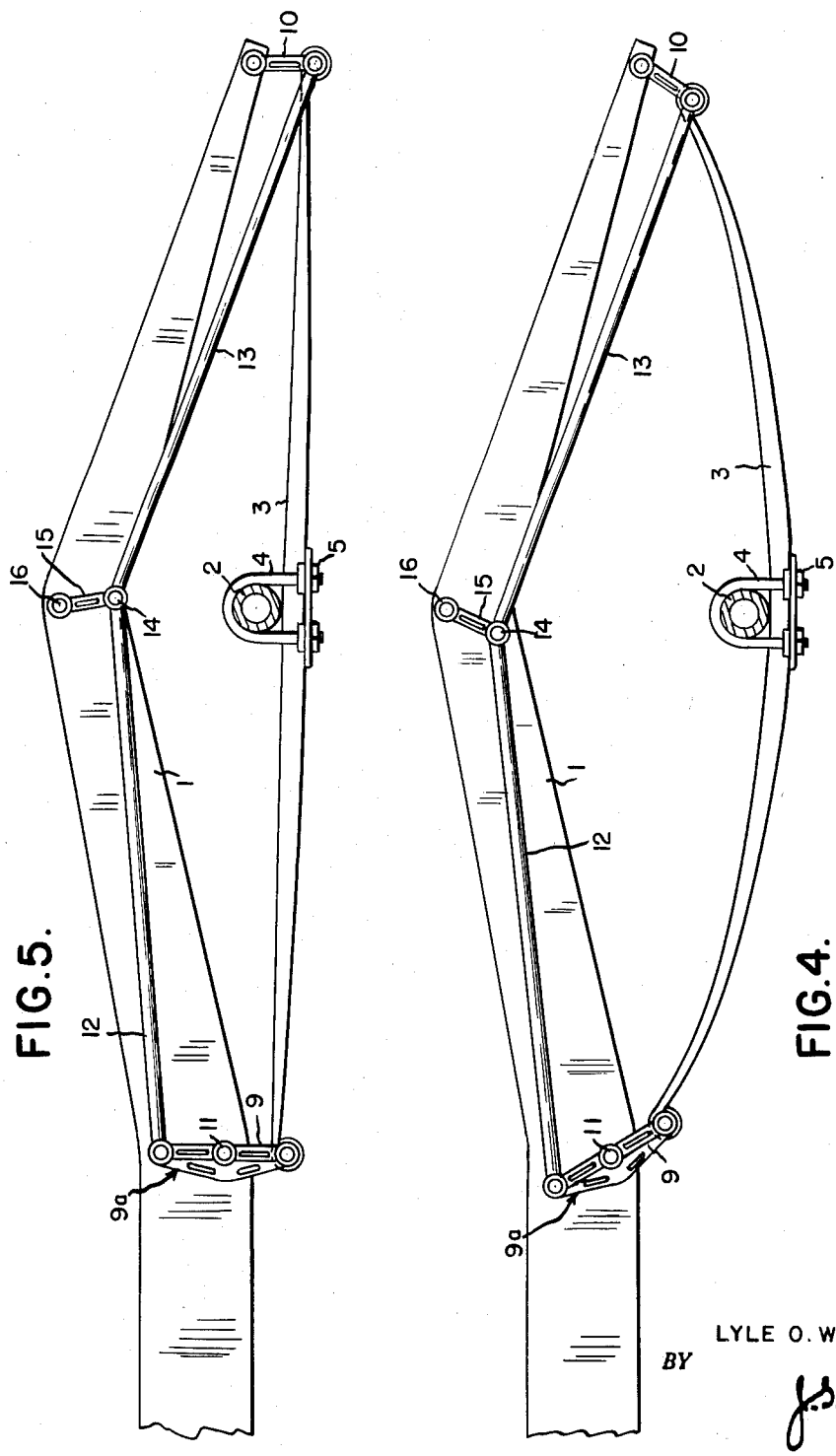

United States Patent Office 2,732,220
Patented Jan. 24, 1956

2,732,220

VEHICLE SPRING SUSPENSION

Lyle O. Ward, Port Huron, Mich.

Application June 12, 1953, Serial No. 361,279

3 Claims. (Cl. 280—124)

This invention relates to vehicle spring suspensions and particularly suspensions employing springs bowed lengthwise of a vehicle frame to transmit a load to an axle.

It is now a general practice as regards springs of the specified type to pivot such springs at their forward ends to the frame and provide shackle connections between the frame and rear ends of the springs. Such an arrangement is objectionable in that the compression of a spring rearwardly shifts the corresponding end of the axle, such shifting amounting to several inches responsive to a maximum spring compression. It follows that a differential compression of the springs surmounting the ends of an axle diverges such axle from its proper transverse relation to the frame, hence tending to alter the direction of vehicle travel. While such an alteration of direction may be corrected by steering wheel manipulation, the driver usually neither expects nor understands such alteration and may not immediately exercise a suitable corrective control. Consequently such an alteration is dangerous and is particularly unsafe at high speeds. Differential compression of the springs adjoining paired wheels of a vehicle may result from one of such wheels encountering a depression or projection on a traction surface, or from wind pressure acting heavily crosswise of a vehicle, or from the centrifugal effect of a lateral variation in the applied direction of vehicle travel. The manner of loading a vehicle may also subject the discussed springs to a differential compression.

An object of the invention is to mount a vehicle frame on an axle end portion by a spring bowed lengthwise of the frame and to eliminate shifting of said end portion lengthwise of the frame, when the spring is flexed.

Another object is to extend a bow spring lengthwise of a vehicle frame mounted by such spring on an axle, using shackle connections between the frame and both ends of the spring, and to so interconnect the front and rear shackles as to restrain the spring and axle from shifting materially lengthwise of the frame responsive to flexure of the spring.

Another object is to form one of said shackles as one arm of a lever pivoted on the frame between its ends, and to provide a link bar connection between the other arm of said lever and the other shackle to induce a reverse swinging of the shackles responsive to flexure of the corresponding spring.

Another object is to employ two interconnected bars to form said link bar connection and to mount such bars on the frame at their interconnection to swing lengthwise of the frame.

These and various other objects are attained by the construction hereinafter described and illustrated in the accompanying drawings, wherein:

Fig. 1 is a side elevational view of a vehicle spring suspension as associated with a rear axle in the practice now common, the spring of such suspension being relaxed.

Fig. 2 is a similar view in which, however, the spring is under a compression sufficient to substantially eliminate its curvature.

Fig. 3 is a top plan view of the same assembly, showing a divergency of the axle from its proper transverse relation to the frame, arising when one of the rear springs is relaxed and the other heavily compressed.

Fig. 4 is a side elevational view of my improved spring suspension showing the spring relaxed.

Fig. 5 is a similar view in which, however, the spring is heavily compressed.

In these views, the reference character 1 designates the frame of a vehicle, 2 the rear axle of such vehicle, 2a the wheels of such axle, and 3 one of a pair of elongated leaf springs mounting the frame on the end portions of the axle. The axle is secured to the spring substantially midway of the spring length, as by the usual U bolt 4 and nuts 5, the spring being normally upwardly bowed in extending forwardly and rearwardly from the axle.

As illustrated in Figs. 1, 2 and 3, it is now a general practice to so pivot the front end of the spring on the frame as to restrain said end from any material forward and back play. Thus said front end is pivoted at 6 on a bracket or brackets 7 rigidly mounted on and depending from the frame. As shown in the same figures, the rear end of the spring, in current practice, pivotally engages the lower end of a shackle 8 having its upper end pivoted on the frame, such shackle thus affording the spring a swinging play lengthwise of the frame. Under a heavy compression stress, the spring 3 loses its bowed form and becomes substantially horizontal as in Fig. 2. As indicated by the dimension D, the point of attachment of the spring to the axles is materially shifted rearwardly consequent to the described spring compression, the amount of such shifting induced by straightening of the spring being commonly about two inches. If the described heavy compression affects only one of the paired rear springs, the axle deviates as per Fig. 3 from its proper transverse relation to the frame, the corresponding wheels consequently deviating to the same angular extent from their intended direction of travel. While a maximum deviation of the axle and wheels has been illustrated and so far discussed, it will be understood that some deviation must occur responsive to any force or forces imposing a differential compression on the two rear springs.

Rear wheel deviations occurring as above described obviously tend to alter the course of travel of a vehicle, and such alteration progresses quite rapidly when a vehicle is traveling at considerable speed. By steering wheel manipulation the driver may correct the discussed alteration, but such alterations are usually unexpected and may result in accidents, particularly at high vehicle speeds. Any deviation of the rear wheels from the course of vehicle travel is moreover productive of a slight skidding effect contributing to tire wear.

Referring now to Figs. 4 and 5, these show a spring suspension avoiding any tendency to angularly vary the relation of the rear axle and frame and hence maintaining parallelism of the wheels to the direction of travel. The usual leaf spring 3 supports the frame through front and rear shackles 9 and 10, engaging the spring extremities and preferably converging at about sixty degrees when the spring is relaxed. The front shackle is formed by the lower arm of a lever 9a pivoted at its mid portion on the frame as indicated at 11. The upper arm of said lever has a thrust connection to the lower end of the shackle 10 established by front and rear link bars 12 and 13 preferably of equal length and pivotally interconnected at 14. Said bars are supported and guided at their interconnection by a shackle 15 pivoted at 16 on the frame and downwardly extending from such pivot to said bars. The mounting for said bars afforded by the shackle 15 is sufficiently elevated on the frame to avoid impact with said bars of the axle when spacing of the frame and axle is minimized by a maximum spring compression. The illustrated frame has its sills or side members arched slightly between the front and rear connections to the spring, thus increasing the vertical clearance between the frame and axle.

From the foregoing description and from a comparison of Figs. 4 and 5, it is evident that the link bars 12 and 13 compel an equal but relatively reverse swinging of the front and rear shackles responsive to any flexure of the corresponding spring, avoiding any resultant horizontal shifting of the corresponding end of the axle. It follows that angular play of the axle responsive to differential flexure of the two rear springs (Figs. 1, 2 and 3) is eliminated, avoiding resultant danger and tire wear, and such steering effort of the driver as is required in present practice to compensate for said angular play.

What I claim is:

1. In a vehicle spring suspension, the combination with the rear axle of a vehicle, a frame surmounting and elongated transversely to such axle and having an arched rear portion affording clearance for relative vertical play between the frame and axle, a spring mounting the frame on the axle and elongated transversely to the axle and upwardly bowed in extending from the axle, and means securing the mid portion of such spring rigidly to the axle, of a pair of front and rear shackles mounting the frame on the spring ends and affording such ends a swinging travel relative to and lengthwise of the frame, one of such shackles being formed as the lower arm of a lever also having an upper arm, a shackle disposed substantially above the axle and having its upper end pivoted on the arched portion of the frame, and a pair of link bars forming swinging connections from the last-mentioned shackle to the front and rear shackles, one of the link bars engaging said upper arm.

2. In a vehicle spring suspension, the combination with an axle, a frame surmounting and elongated transversely to the axle, a spring mounting the frame on the axle and elongated transversely to the axle and upwardly bowed in extending from the axle, and means securing the mid portion of such spring rigidly to the axle, of a pair of front and rear shackles mounting the frame on the spring ends, and affording such ends a swinging travel relative to and lengthwise of the frame, one of such shackles being formed as the lower arm of a lever also having an upper arm, and means for transmitting thrust from said upper arm to the lower portion of the other shackle, said thrust-transmitting means comprising a pair of elongated link bars pivoted respectively to said upper lever arm and to the shackle remote from such arm, means pivotally interconnecting the link bars, and a guide means on the frame engaging at least one of said bars adjacent to their interconnection.

3. A vehicle spring suspension as set forth in claim 2, said guide means comprising a shackle, pivoted on the frame and engaging said bars at their interconnection.

References Cited in the file of this patent

UNITED STATES PATENTS 2,687,311     Nallinger _____ Aug. 24, 1954

FOREIGN PATENTS 158,685     Great Britain _____ Feb. 10, 1921